(12) United States Patent
Pesik

(10) Patent No.: US 11,094,210 B2
(45) Date of Patent: Aug. 17, 2021

(54) AIRPORT SURFACE NAVIGATION AID

(71) Applicant: Simmonds Precision Products, Inc., Vergennes, VT (US)

(72) Inventor: Joseph T. Pesik, Eagan, MN (US)

(73) Assignee: SIMMONDS PRECISION PRODUCTS, INC., Vergennes, VT (US)

(*) Notice: Subject to any disclaimer, the term of this patent is extended or adjusted under 35 U.S.C. 154(b) by 554 days.

(21) Appl. No.: 15/975,302

(22) Filed: May 9, 2018

(65) Prior Publication Data

US 2019/0347943 A1  Nov. 14, 2019

(51) Int. Cl.
G08G 5/06 (2006.01)
B64D 47/08 (2006.01)
G06K 9/62 (2006.01)
G08G 5/00 (2006.01)

(52) U.S. Cl.
CPC ............. *G08G 5/065* (2013.01); *B64D 47/08* (2013.01); *G06K 9/6202* (2013.01); *G08G 5/0021* (2013.01)

(58) Field of Classification Search
CPC ...... G08G 5/065; G08G 5/0021; B64D 47/08; G06K 9/6202; G06K 9/2054; G06K 9/00798
See application file for complete search history.

(56) References Cited

U.S. PATENT DOCUMENTS

| 6,405,975 B1 | 6/2002 | Sankrithi et al. |
| 6,571,166 B1 | 5/2003 | Johnson et al. |
| 7,592,929 B2 | 9/2009 | Pepitone |
| 7,974,773 B1 | 7/2011 | Krenz et al. |
| 8,868,265 B2 | 10/2014 | Koukol et al. |
| 9,047,771 B1 | 6/2015 | Thoreen et al. |
| 9,174,746 B1 | 11/2015 | Bell et al. |
| 9,245,450 B1 | 1/2016 | Chiew et al. |

(Continued)

FOREIGN PATENT DOCUMENTS

| CA | 2464791 A1 | 10/2004 |
| CA | 2737189 A1 | 10/2011 |

(Continued)

OTHER PUBLICATIONS

Extended European Search Report dated Sep. 11, 2019, received for corresponding European Application No. 19173358.3, 6 pages.

(Continued)

*Primary Examiner* — Rami Khatib
(74) *Attorney, Agent, or Firm* — Kinney & Lange, P.A.

(57) ABSTRACT

A system includes a camera mounted on an aircraft, one or more processors, and computer readable memory, for determining a location of an aircraft relative to fiducial markings of airport byways. The method includes the steps of capturing, by a camera disposed on the aircraft, a time-sequence of images of a scene external to the aircraft, wherein the scene includes the byways and the fiducial markings; identifying, by image processing circuitry, pixel coordinates within each of the time sequence of captured images corresponding to the fiducial markings; and determining, by the image processing circuitry, the location of the aircraft relative to the fiducial markings based on the identified pixel coordinates.

19 Claims, 5 Drawing Sheets

(56) References Cited

U.S. PATENT DOCUMENTS

| | | | |
|---|---|---|---|
| 9,401,094 B2 | 7/2016 | Cros et al. | |
| 2007/0112517 A1* | 5/2007 | Goldstein | G01C 23/00 |
| | | | 701/301 |
| 2007/0241936 A1 | 10/2007 | Arthur et al. | |
| 2010/0094487 A1 | 4/2010 | Brinkman | |
| 2013/0138273 A1* | 5/2013 | Koukol | G08G 5/0065 |
| | | | 701/15 |
| 2014/0092206 A1 | 4/2014 | Boucourt et al. | |
| 2014/0297168 A1 | 10/2014 | Ovens et al. | |
| 2015/0142214 A1 | 5/2015 | Cox et al. | |
| 2016/0153805 A1* | 6/2016 | Argentieri | G01C 23/005 |
| | | | 73/170.06 |
| 2016/0379499 A1* | 12/2016 | Balasubramanian | ........................ |
| | | | G08G 5/0013 |
| | | | 701/300 |
| 2017/0301250 A1 | 10/2017 | Ell et al. | |
| 2017/0334578 A1 | 11/2017 | Fleck et al. | |
| 2020/0027362 A1* | 1/2020 | Dame | G01C 21/20 |

FOREIGN PATENT DOCUMENTS

| | | |
|---|---|---|
| CN | 105391975 A | 3/2016 |
| EP | 0980828 A1 | 2/2000 |
| EP | 1842772 A2 | 10/2007 |
| EP | 1927965 A2 | 6/2008 |
| EP | 2426461 A2 | 3/2012 |
| EP | 2495168 A1 | 9/2012 |
| EP | 2565861 A2 | 3/2013 |
| EP | 2685442 A2 | 1/2014 |
| EP | 3109845 A1 | 12/2016 |
| WO | 2009010969 A2 | 1/2009 |

OTHER PUBLICATIONS

International Civil Aviation Organization, "Aerodrome Standards: Aerodrome Design and Operations", ICAO: Cooperative Development of Operational Safety and Continuing Airworthiness, dated Jul. 1999, 194 pages.

International Civil Aviation Organization, "Airport Markings: ICAO & U.S. Requirements", ICAO: Federal Aviation Administration, dated Jun. 2012, 19 pages.

U.S. Department of Transporation, "Advisory Circular", U.S. DOT: Federal Aviation Administration, dated Sep. 27, 2013, 144 pages.

Xu, Lun Hui et al., "A New Lane Department Warning Algorithm Considering the Driver's Behavior Characteristics", Hindawi Publishing Corporation: Mathematical Problems in Engineering, dated Jul. 26, 2015, 12 pages.

Federal Aviation Administration, "A Quick Reference to Airfield Standards", FAA: Southern Region Airports Division, dated Jan. 2018, 69 pages.

* cited by examiner

AIRPORT SURFACE NAVIGATION AID

BACKGROUND

Each year, significant time and money are lost due to commercial aircraft accidents and incidents during ground operations, of which significant portions occur during maneuvers on the taxiways and aprons. There are numerous phases of ground operations that occur for aircraft during arrival to and departure from an airport. The taxi-in (TXI) and taxi-out (TXO) phases, for example, require the aircraft to move between the runway and terminal gates along surface byways. These surface byways are generally marked using standardized symbols that the flight crew members are trained to recognize. These markings can include a center line, edge markings, and stop lines, as well as numbers and other symbols. Collectively, these markings can be referred to as fiducial markings, or simply fiducials, because they are used to guide the flight crew in ground operations. Painted markings can typically be used, and lighted markers can also be used for enhanced visibility, particularly at night.

During ground operations, aircraft share the taxiways and aprons with other aircraft, fuel vehicles, baggage carrying trains, mobile stairways, and many other objects. The flight crew must guide the aircraft to avoid the many obstacles, while also following the prescribed ground path along the byways. This ground path can be onerous, particularly at larger airports. The prescribed byway path an aircraft is directed to follow during TXI/TXO can also change, possibly during the ground transit, to accommodate changes in gate assignments, runway assignments, or takeoff direction as a result of changes in wind speed and/or direction. By following a prescribed byway path assignment and the marks along these byways, the flight crew can avoid interference with other aircraft and objects that are on and adjacent to the byways. Importantly, maintaining the aircraft along the centerline of a byway can be critical in avoiding collisions with vehicles and structures near the byway. The wing tips of aircraft can be particularly vulnerable to collisions with other objects, and aircraft with larger wingspans are therefore particularly vulnerable. By not following the prescribed route of some byways, an aircraft can enter an unintended area, possibly delaying the transit along the byway, and/or the transit of other aircraft that share the byways at an airport. Even if a collision does not occur, significant cost can be associated with an aircraft not following a prescribed byway. For example, a delayed takeoff or gate arrival can disrupt airline schedules, possibly leading to missed connections for passengers. An aircraft that unintentionally proceeds down the wrong byway may require assistance in recovering from the error. Moreover, if an aircraft rolls off the edge of a byway, there is a possibility that its wheels can sink into soft ground, thereby requiring assistance in returning to the byway.

During TXI and TXO, the attention of the flight crew can be distracted from guiding the aircraft on the ground to attend to communications and announcements internally and with the ground controller, arrival/departure checklists, security issues, and potentially a plethora of other distractions. This often is a formidable task, even under the best of visibility conditions. During powered aircraft ground procedures, the flight crew is located in a central cockpit where they are fairly well positioned to observe markings that are directly in front of the cabin of the aircraft, although markings to the side and on curves can be difficult to follow because of parallax errors and other complications. For example, under some lighting condition and/or during inclement weather, some markings can be difficult for the flight crew to discern from their perspective in the cockpit. Additionally, whether from poor visibility or through human error, the flight crew may misidentify a marking, possibly guiding the aircraft in a wrong direction that could lead to a mishap, including any of those described above.

SUMMARY

A system for determining a location of an aircraft relative to fiducial markings of airport byways, the system including a camera configured to be mounted to the aircraft and further configured to capture a time-sequence of images of a scene external to the aircraft, the scene including the airport byways and the fiducial markings; and image processing circuitry configured to identify pixel coordinates within each of the time-sequence of captured images corresponding to the fiducial markings, and further configured to determine the location of the aircraft relative to the fiducial markings based on the identified pixel coordinates A method for determining a location of an aircraft relative to fiducial markings of airport byways, the method including the steps of: capturing, by a camera disposed on the aircraft, a time-sequence of images of a scene external to the aircraft, wherein the scene includes the byways and the fiducial markings; identifying, by image processing circuitry, pixel coordinates within each of the time sequence of captured images corresponding to the fiducial markings; and determining, by the image processing circuitry, the location of the aircraft relative to the fiducial markings based on the identified pixel coordinates.

A system including: a camera disposed on an aircraft; one or more processors; and computer-readable memory encoded with instructions that, when executed by the one or more processors, cause the system to: capture, by the camera, a time-sequence of images of a scene external to the aircraft, the scene including byways and indicia of the byway boundaries; identify, by image processing circuitry, pixel coordinates within each of the time-sequence of captured images corresponding to the indicia of the byway boundaries; and determine, by the image processing circuitry, a location of the aircraft relative to the byway boundaries based on the identified pixel coordinates.

DETAILED DESCRIPTION

Apparatus and associated methods relating to rendering and displaying a perspective view of aircraft taxi operation and providing the flight crew with fiducial image enhancement are disclosed.

Figure 1:
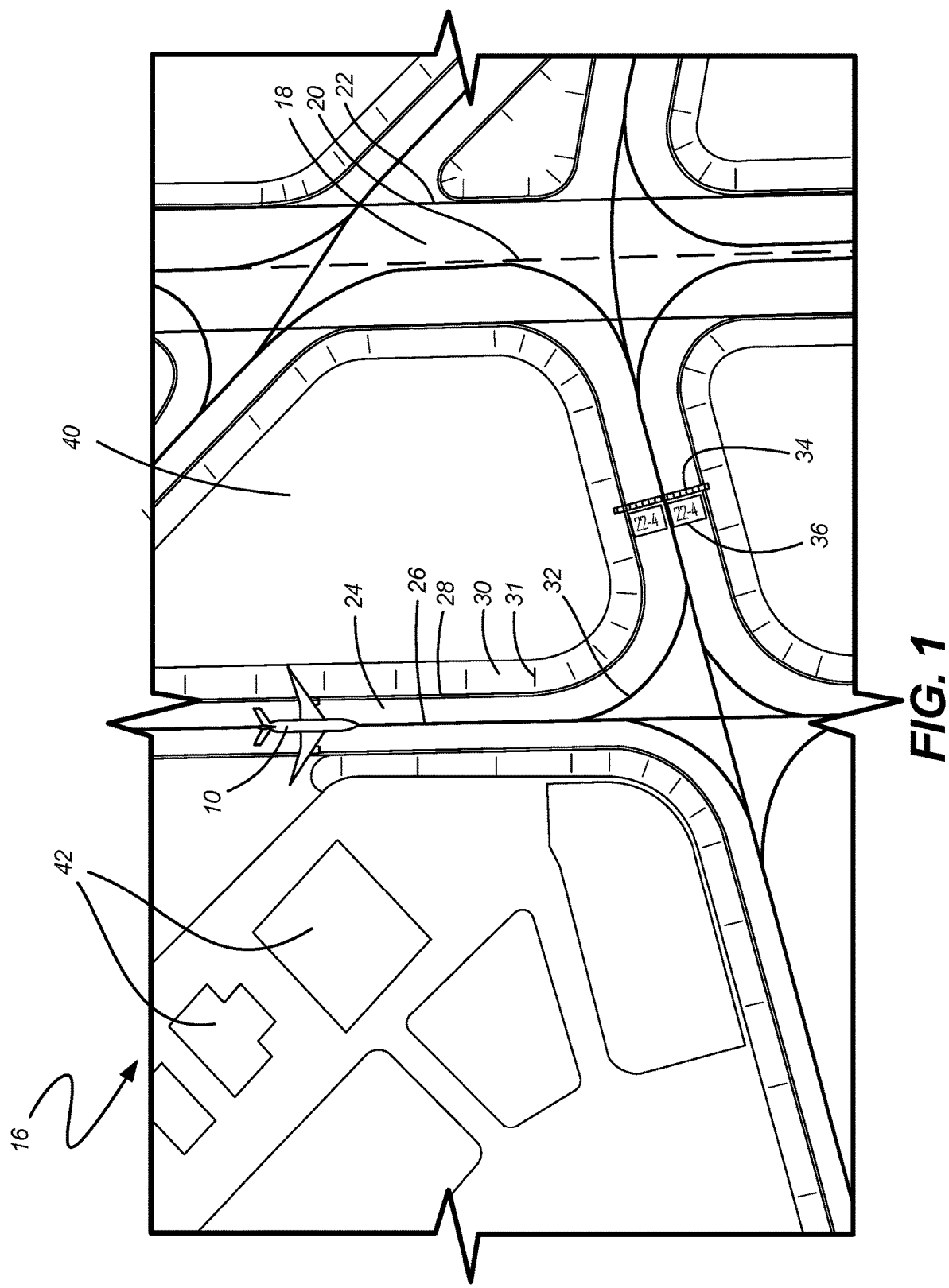
FIG. 1 is a plan view of a taxiing aircraft scenario at an exemplary airport.

FIG. 1 is a plan view of a taxiing aircraft scenario at an exemplary airport. Shown in FIG. 1 are aircraft 10, airport 20, runway 22, taxiway 24, center line 26, edge line 28, shoulder 30, turn arc 32, stop marker 34, identification numbers 36, grass 40, and buildings 42. In FIG. 1, taxiing aircraft 10 is navigating taxiway 24 of airport 20. Aircraft 10 can navigate taxiway 24 under its own power prior to departure, for example, while transiting from the airport terminal (not shown) to runway 22 during TXO for take-off. Similarly, aircraft 10 can navigate taxiway 24 under its own power after landing on runway 22, for example, while transiting from runway 22 to the airport terminal (not shown) during TXI. The flight crew guides aircraft 10 along taxiway 24 by following center line 26. Edge lines 28 denote the outer edges of taxiway 24. In the illustrated embodiment, shoulders 30 are beyond edge lines 28. Turn arc 32 indicates the path that aircraft 10 should follow while turning from a first taxiway 24 to a second taxiway 24. Stop marker 34 denotes the point on taxiway 24 where aircraft 10 should stop and wait for permission to proceed to runway 22 for take-off. Identification numbers 36 indicate to the flight crew the identity of runway 22 that aircraft 10 is proceeding to. Taxiways 24 and runway 22 can also be referred to as byways. In the illustrated embodiment, grass 40 surrounds the region of airport 20 between the various byways and buildings 42 are located throughout areas on airport 20 in the vicinity of taxiways 24. In other embodiments, grass 40 can be replaced with any suitable ground cover including pavement, dirt, and gravel.

It can be undesirable for aircraft 10 to stray from center line 26 or turn arcs 32 while taxiing, as this could cause various extremity features of aircraft 10 to strike objects that are outside of taxiway 24. Examples of the various extremity features of aircraft 10 that can be particularly susceptible to striking other objects include wingtips, vertical stabilizer, horizontal stabilizer, nose, and engine nacelles (not shown). If the wheels (not shown) of aircraft 10 stray beyond edge lines 28, damage can be inflicted on various markers, signage, and other components (not shown) that are located outside of edge lines 28. Moreover, if one or more wheels of aircraft 10 contacts grass 40, the wheel(s) can sink into grass 40, potentially causing aircraft 10 to become stuck and require assistance in being extracted.

Center line 26, edge line 28, turn arc 32, stop marker 34, and identification numbers 36 can be referred to as fiducials because they are used to guide the flight crew in ground operations. In the illustrated embodiment, center line 26, edge line 28, turn arc 32, stop marker 34, and identification numbers 36 can be painted onto the surface of taxiway 24. It can be beneficial for standardized styles, sizes, and colors to be used for these fiducials to provide for consistency between airport 20 and other various airports. It can also be preferable to provide highly visible markings for these fiducials to assist the flight crew in their ability to see these fiducials during adverse lighting conditions and/or in inclement weather. In some embodiments, center lines 26, edge lines 28, and turn arcs 32 can have different patterns and/or colors to identify the particular type of byway. Light markers (not shown) can also be used as fiducials, for example, near edge lines 28, to provide higher visibility to the flight crew at night or during inclement weather.

It can be important for flight crew of aircraft 10 to guide aircraft 10 along the predetermined byways, for example, to allow aircraft 10 to proceed to a correct runway 22 for takeoff, or to proceed to a correct terminal gate (not shown) for the disembarking of passengers. Moreover, in not guiding aircraft 10 along the correct taxiway 24, aircraft 10 can enter an area that could pose a collision hazard with another aircraft (not shown). Accordingly, proper identification of the various ground fiducials can be advantageous in the proper, safe, and timely operation of aircraft 10.

Figure 2A:
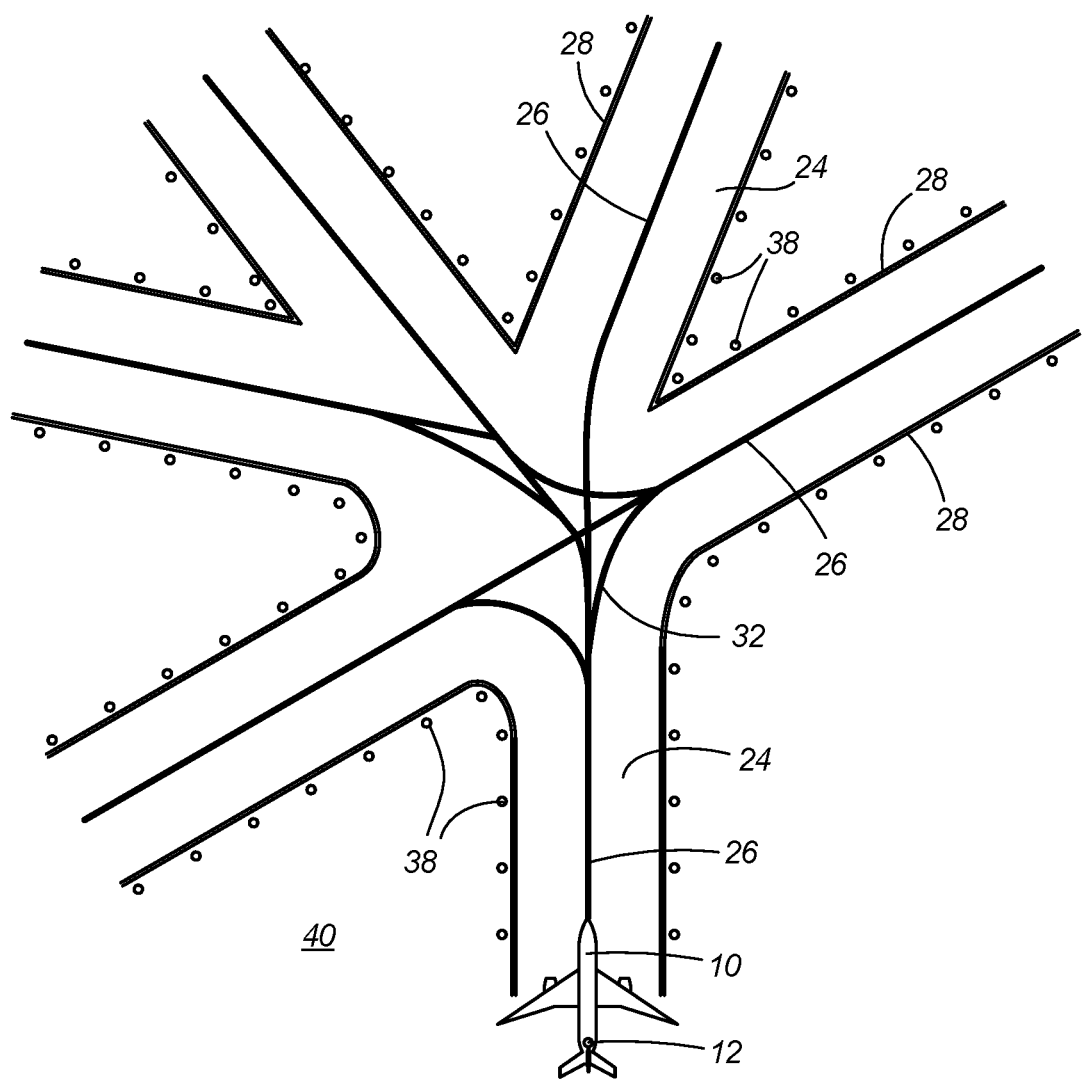
FIG. 2A is a plan view of a taxiing aircraft scenario on an exemplary taxiway system.

FIG. 2A is a plan view of a taxiing aircraft scenario on an exemplary taxiway system. Shown in FIG. 2A are aircraft 10, camera 12, taxiway 24, center line 26, edge line 28, shoulder 30, turn arc 32, light markers 38, and grass 40. In the illustrated embodiment, taxiways 24, center lines 26, edge lines 28, turn arcs 32, and grass 40 are substantially as described in FIG. 1. In the illustrated embodiment, camera 12 is attached to the tail of aircraft 10. In other embodiments, camera 12 can be attached to other portions of aircraft 10, with non-limiting examples including on a vertical stabilizer, one a wing, and on the belly. In some embodiments, two or more cameras 12 can be attached to aircraft 10.

In the illustrated embodiment, light markers 38 line the edges of taxiways 24. Light markers 38 are additional fiducials that the flight crew of aircraft 10 relies on, particularly during low-light conditions including during dawn, dusk, nighttime, and in inclement weather. In some embodiments, light markers 38 can have different colors that represent different types of byways and/or different regions of a particular byway. For example, center line 26 and edge lines 28 are different byway regions of importance to the flight crew.

In the illustrated embodiment, the flight crew guides aircraft 10 along center line 26 as the intended path of travel in front of aircraft 10. Camera 12 is attached to aircraft 10 and is oriented to capture a forward-looking image of the environment external to aircraft 10. In the illustrated embodiment, camera 12 is attached to the tail of aircraft 10. In other embodiments, camera 12 can be attached to other portions of aircraft 10. In some embodiments, two or more cameras 12 can be attached to aircraft 10.

Figure 2B:
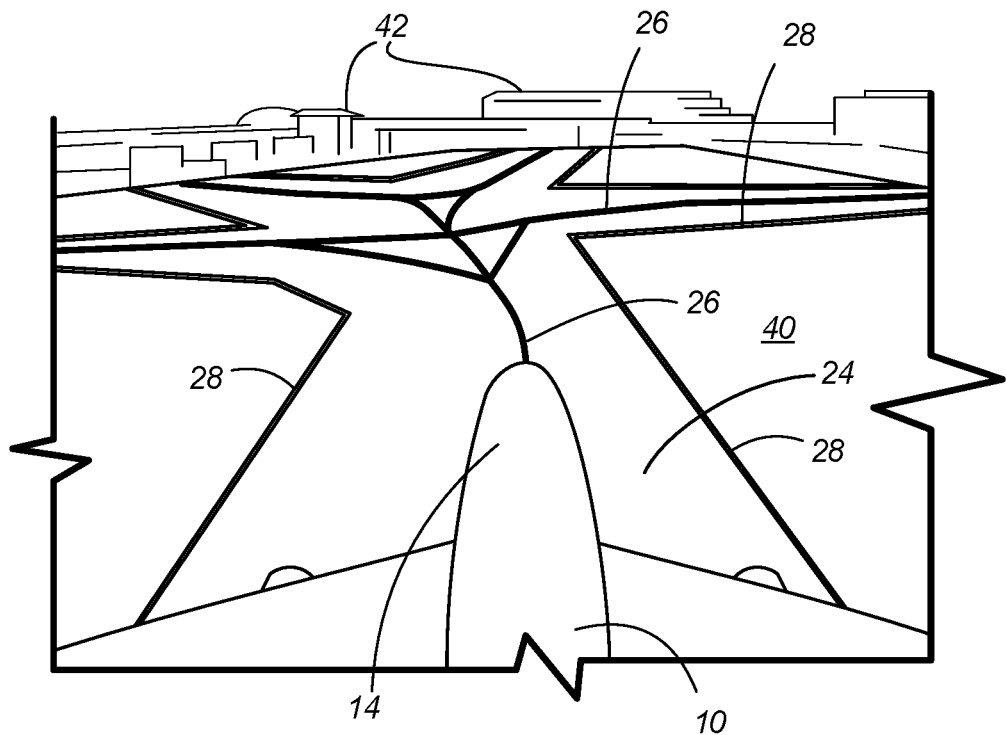
FIG. 2B is a display image of the taxiway system shown in FIG. 2A.

FIG. 2B is a display of the image captured by camera 12, showing a perspective view of the taxiway system shown in FIG. 2A. Accordingly, FIG. 2B is a display image of the taxiing aircraft scenario shown in FIG. 2A being captured by camera 12. For example, the display image of FIG. 2B could be displayed on a video display (not shown) in the cockpit (not shown) of aircraft 10. Shown is FIG. 2B are fuselage 14 of aircraft 10, taxiways 24, centerline 26, edge lines 28, and buildings 42. As described in FIG. 2A, tail camera 12 captures a forward-looking view external to aircraft 10. Accordingly, fuselage 14 of aircraft 10 is included in the forward-looking view. In the illustrated embodiment, camera 12 is positioned approximately along the centerline of aircraft 10, thereby providing an approximately symmetrical view of the forward environment external to aircraft 10. In some embodiments, camera 12 can be located off of center, thereby capturing an asymmetrical view. In other embodiments, one or more cameras (not shown) can be mounted at other locations on aircraft 10 (as described in FIG. 2A). For example, in these other embodiments, a wing camera (not shown) can be mounted on either or both wings. In yet other embodiments, one or more cameras 12 could be mounted on fuselage 14, or on the belly of aircraft 10.

Referring again to FIG. 2B, the image that is captured from camera 12 can be useful to the flight crew in navigating aircraft 10 along taxiway 24. Under some conditions, however, the flight crew may have difficulty in identifying the various fiducials along taxiway 24 to provide for the safe navigation of aircraft 10. For example, it may be difficult to discern center line 26 from edge lines 28 under some conditions of lighting and/or weather. Additionally, for example, it may be difficult in identifying more distant fiducials that are in the visual vicinity of buildings 42 and any other visual distractions that can exist. As will be described in FIG. 4, the navigation aid system automatically detects the various fiducials along taxiway 24 and calculates the lateral deviation between aircraft 10 and the lateral intended path of aircraft 10. For example, in a typical TXI or TXO scenario under an embodiment, the lateral intended path of aircraft 10 may be directly over centerline 26. In this embodiment, visual and/or audio warnings can be generated to alert the flight crew if the lateral deviation exceeds a particular threshold level. In other embodiments, the calculated lateral deviation can be input to an automated control system that assists in guiding aircraft 10 during TXI/TXO. As used in this disclosure, the lateral deviation can be referred to as a deviation.

Figure 2C:
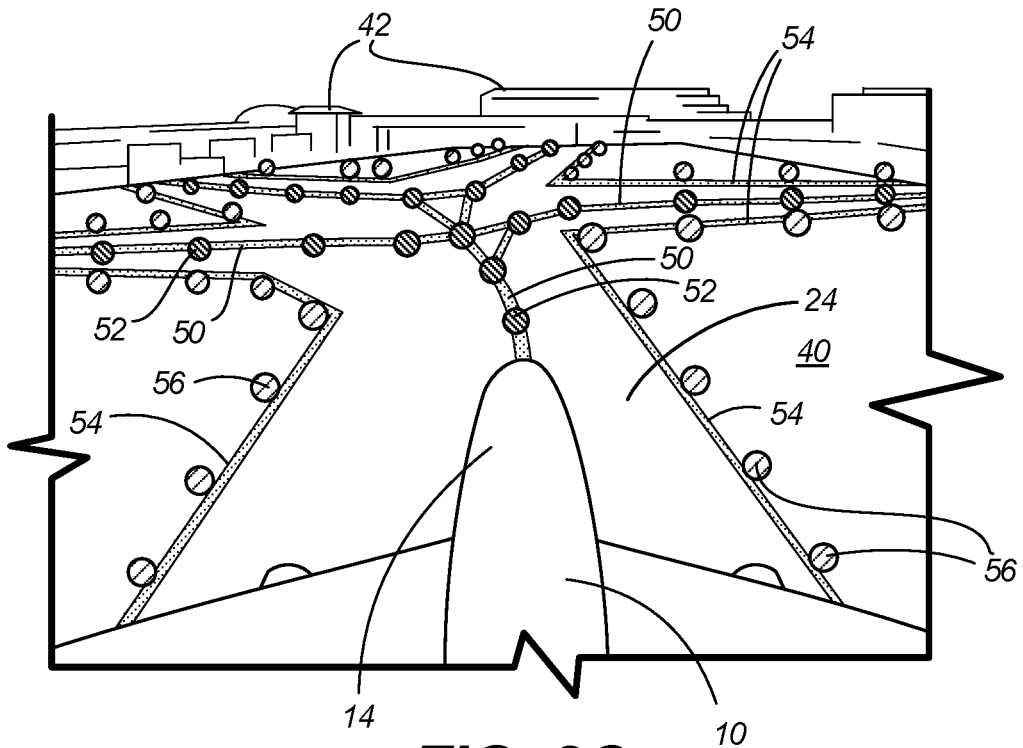
FIG. 2C is a navigation aid system display image of the taxiway system shown in FIG. 2A.

FIG. 2C is an enhanced display image of the taxiing aircraft scenario shown in FIG. 2A being captured by camera 12. The image enhancement is produced using video processing and feature recognition of the navigation aid system (described in FIG. 4). Shown in FIG. 2C are fuselage 14, taxiways 24, buildings 42, enhanced centerline 50, enhanced center lights 52, enhanced edge lines 54, and enhanced edge lights 56. In the enhanced display depicted in FIG. 2C, enhanced centerline 50, enhanced center lights 52, enhanced edge lines 54, and enhanced edge lights 56 are produced and displayed by the navigation aid system (described in FIG. 4) and displayed for the flight crew to use in navigating aircraft 10 along taxiway 24.

Figure 3:
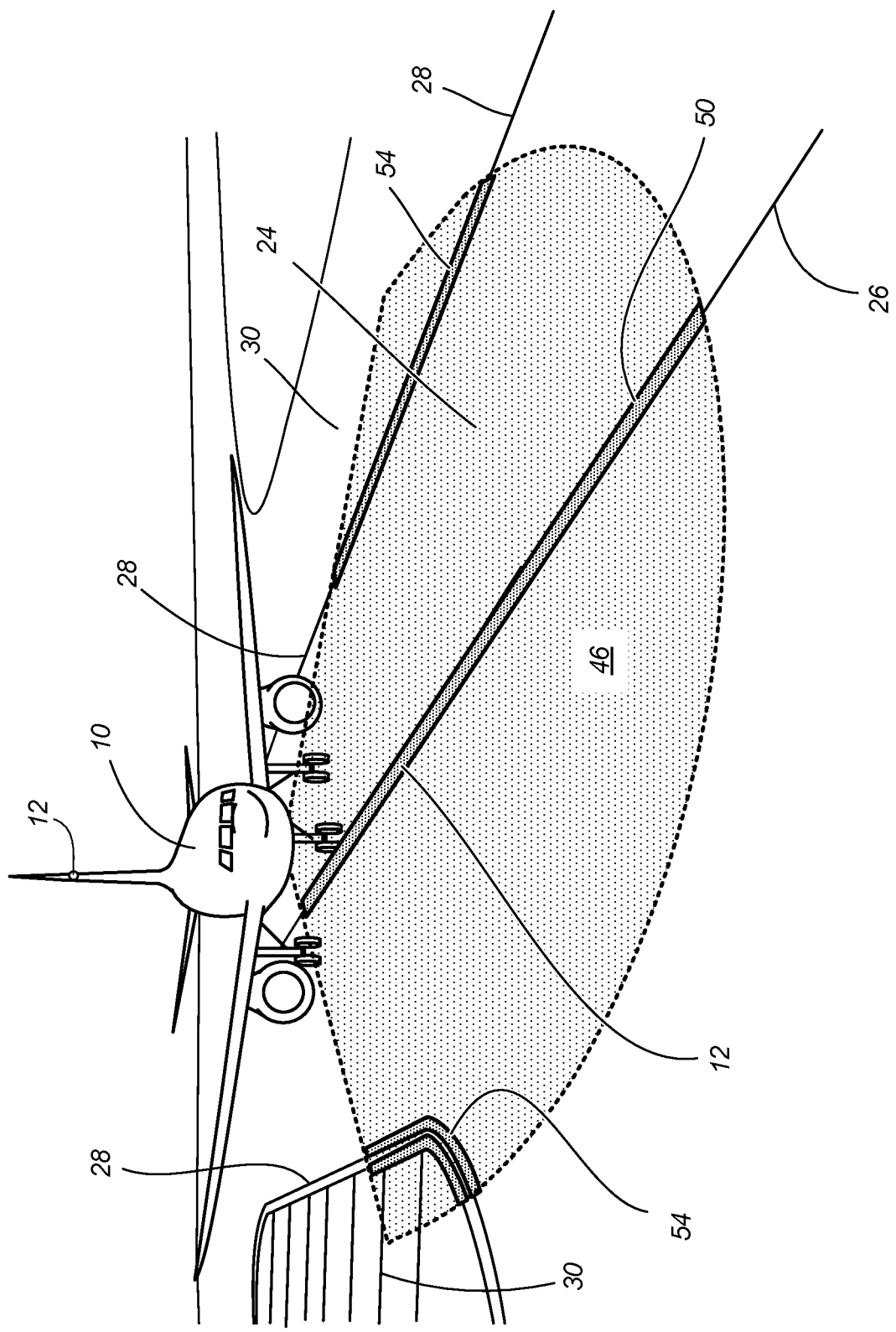
FIG. 3 is a perspective view of a taxiing aircraft with enhanced display image.
Figure 4:
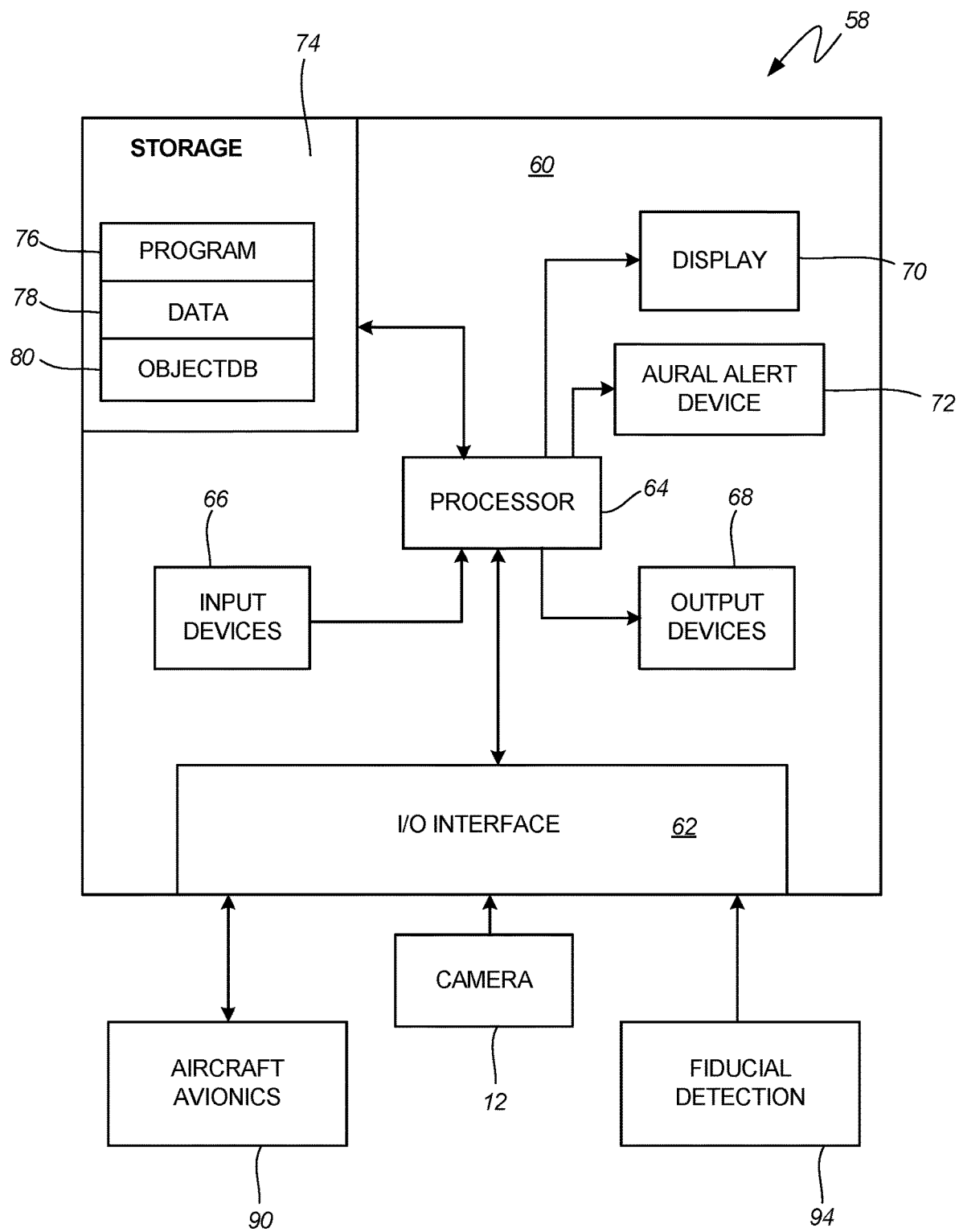
FIG. 4 is a block diagram of the exemplary airport navigation aid system.

FIG. 3 is a perspective view of a taxiing aircraft scenario depicting the enhanced display image that is produced by the navigation aid system (described in FIG. 4). FIG. 3 illustrates exemplary image enhancements that can be produced by the navigation aid system. Shown in FIG. 3 are aircraft 10, camera 12, taxiway 24, center line 26, edge line 28, shoulder 30, field of view 46, enhanced center line 50, and enhanced edge line 54. In the illustrated embodiment, aircraft 10 is being taxied along taxiway 24 by the flight crew, with the objective of maintaining aircraft 10 positioned over center line 26, thereby avoiding edge lines 28 and shoulders 30. Camera 12 captures the forward-looking imagery of aircraft 10 while having field of view 46. Navigation aid system generates enhanced center line 50 and enhanced edge lines 54 on a video display that is located in the cockpit (not shown) of aircraft 10. FIG. 3 depicts field of view 46 of camera 12, thereby allowing the navigation aid system to provide enhancement of navigation aids. It is to be appreciated that FIG. 3 does not depict the image that is generated by camera 12 and navigation aid system, because the generated image is captured by forward-looking camera 12 mounted on the tail of aircraft 10.

FIG. 4 is block diagram of an embodiment of navigation aid system 58 for rendering and displaying a perspective view of aircraft taxi operation and providing the flight crew with fiducial image enhancement. Shown in FIG. 4 are navigation aid system 58, image enhancement system 60, aircraft avionics 90, camera 12, and fiducial detection system 94. Image enhancement system 60 includes input/output interface 62, processor(s) 64, user input devices 66, user output devices 68, display 70, aural alert device 72, and storage device(s) 74. Storage device(s) 74 have various storage or memory locations. Storage device(s) 74 include program memory 76, data memory 78, and object database 80.

Image enhancement system 60 is in communication with aircraft avionics 90, camera 12, and fiducial detection system 94 via input/output interface 62. Aircraft avionics 90 can provide image enhancement system 60 with metrics indicative of a taxiing aircraft's location, orientation, speed, etc. Camera 12 provides visual imagery of the ground navigation environment to image enhancement system 60.

As illustrated in FIG. 4, image enhancement system 60 includes processor(s) 64, input/output interface 62, user input devices 66, user output devices 68, video display 70, aural alert device 72, and storage device(s) 74. However, in certain examples, image enhancement system 60 can include more or fewer components. For instance, in examples where image enhancement system 60 is an avionics unit, image enhancement system 60 may not include user input devices 66 and/or user output devices 68. In some examples, such as where image enhancement system 60 is a mobile or portable device such as a laptop computer, image enhancement system 60 may include additional components such as a battery that provides power to components of image enhancement system 60 during operation.

Processor(s) 64, in one example, are configured to implement functionality and/or process instructions for execution within image enhancement system 60. For instance, processor(s) 64 can be capable of processing instructions stored in storage device(s) 74. Examples of processor(s) 75 can include any one or more of a microprocessor, a controller, a digital signal processor (DSP), an application specific integrated circuit (ASIC), a field-programmable gate array (FPGA), or other equivalent discrete or integrated logic circuitry.

During operation, image enhancement system 60 receives external imagery input from camera 12. In the illustrated embodiment, camera 12 is located on the tail of aircraft 10 with a forward-looking field of view, as shown in FIG. 2B. In some embodiments, camera 12 can be mounted on other regions of aircraft 10, with non-limiting examples including the fuselage, wings, and underbelly of aircraft 10. In some embodiments, two or more cameras 12 can be used to provide external imagery input to image enhancement system 60. In the illustrated embodiment, an electrical cable (not shown) transmits an electrical external imagery signal from camera 12 to input/output interface 62 of image enhancement system 60. In some embodiments, an optical fiber cable (not shown) can transmit an optical external imagery signal from camera 12 to input/output interface 62. In other embodiments, camera 12 can transmit a wireless external imagery signal from camera 12 to input/output interface 62.

In the illustrated embodiment, camera 12 provides a video signal representing the external imagery that is captured by camera 12. As used in this disclosure, a video signal can be represented as a time sequence of static image frames, with each successive image frame captured and transmitted from camera 12 a period of time following a previous image frame. Accordingly, one image frame can be referred to as a first image and the next image frame can be referred to as a second image. Each image frame is represented as an ordered array of pixels. In the illustrated embodiment, camera 12 transmits images at a particular frame rate, a measure of the number of frames per second (fps). Camera 12 transmits images at a particular image resolution measured in the total number of pixels, a measure of the number of megapixels (mp) per frame.

During operation, image enhancement system 60 evaluates the visual imagery contained in the video signal from camera 12 and recognizes various fiducials by mapping the pixel coordinates of detectable fiducials. In the illustrated embodiment, the detectable fiducials include center lines 26, edge lines 28, shoulders 30, turn arcs 32, and edge lights 38. In some embodiments, detectable fiducials can also include stop line 34 and runway numbers 36 (as shown in FIG. 1).

In other embodiments, detectable fiducials can also include other fiducials that can be used at airport 20. The detection and compilation of the various fiducials in a certain situation can be used to identify or to validate the specific location of aircraft 10 on any particular runway 22 or taxiway 24 at airport 20. This can be useful, for example, in determining whether aircraft 10 is on runway 22 where heightened situational awareness may be required of the flight crew. Image enhancement system 60 can also identify the location of aircraft 10 at a particular intersection of byways. In some embodiments, image enhancement system 60 can be input to a moving maps system to assist the flight crew in providing ground navigation of aircraft 10. Accordingly, navigation aid system 58 can help enhance the situational awareness of the flight crew. The detection of all airport fiducial markings that are in use at airports or which may be later developed for use at airports are within the scope of the present disclosure. Processor(s) 64 evaluates successive image frames from camera 12, identifying the pixel coordinates of fiducials. By comparing the pixel coordinates of detectable fiducials in an image, and by making a similar comparison over successive frames, image enhancement system 60 calculates the pixel coordinates that each detected fiducial would occupy in the captured image from camera 12. In the illustrated embodiment, image enhancement system 60 builds an internal database of fiducial images from the ongoing processing of visual imagery. In some embodiments, image enhancement system 60 can read a database of fiducial images from storage device(s) 74. In some of these embodiments, storage device(s) 74 can receive a database of fiducial images from sources external to image enhancement system 60. For example, in an exemplary embodiment, image enhancement system 60 can receive data representing fiducial images via user input devices 66. In another exemplary embodiment, image enhancement system 60 can receive data representing fiducial images via input/output interface 62.

Referring back to FIG. 4, navigation aid system 58 calculates the deviation between aircraft 10 and the intended path of aircraft 10. For example, in the TXI scenario shown in FIG. 2B, the intended path of aircraft 10 can be directly over center line 26. In this embodiment, navigation aid system calculates a control band to either side of center line 26 which acts as a sensing threshold. Image enhancement system 60 provides a signal representing the deviation of aircraft 10 from the intended path, and displays an indication of this deviation on display 70. An audio indication of this deviation can be provided by aural alert device 72, and navigation aid system 58 can also communicate the value of the deviation to other systems via I/O interface 62. Image enhancement system 60 also provides an output if aircraft 10 violates the control band to either side of center line 26, with the output being an indication of display 70 and a warning sound or message on aural alert device 72. In other embodiments, the calculated deviation can be input to an automated control system that assists in guiding aircraft 10 during TXI/TXO. In some embodiments, the signal representing the calculated deviation can be provided to a control system that causes braking of airplane 10 if the calculated deviation exceeds a threshold value.

In other embodiments, navigation aid system 58 can use fiducial markings other than center line 26 for calculating the deviation signal. Non-limiting examples of the other fiducial markings include edge line 28, shoulder 30, and turn arc 32.

In some TXI/TXO situations it may not be desirable for aircraft 10 to follow center line 26. For example, it may be necessary for aircraft 10 to intentionally deviate from center line 26 for collision avoidance with an obstacle based on inputs from an obstacle detection system (not shown). The obstacle could be a stationary obstacle, such as a parked vehicle or a damaged section of taxiway 24. The obstacle could also be a moving obstacle, such as another aircraft or a rolling vehicle. In the illustrated embodiment, these situations the intended collision avoidance path of aircraft 10 can be input to navigation aid system 58. In some embodiments, navigation aid system 58 can automatically calculate the intended collision avoidance path of aircraft 10. Accordingly, in these embodiments, image enhancement system 60 provides a signal representing the deviation of aircraft 10 from the intended collision avoidance path of aircraft 10.

In yet other embodiments, navigation aid system 58 can receive information about nearby aircraft or support vehicles from an Automatic Dependent Surveillance-Broadcast (ADS-B) system. In these other embodiments, the ADS-B system can provide data to allow navigation aid system 58 to determine if a nearby obstacle can be safely avoided, and if so, navigation aid system 58 can calculate the intended collision avoidance path of aircraft 10.

Referring back to FIGS. 2B and 2C, image enhancement system 60 superimposes enhanced images of detected fiducials over an image of external imagery captured by camera 12. Non-limiting examples of enhanced images of detected fiducials include enhanced center line 50, enhanced center lights 52, enhanced edge line 54, and enhanced edge light 56. In the embodiment represented in FIG. 4, image enhancement system 60 provides a near real-time display of visual imagery in front of aircraft 10 with enhanced fiducials on video display 70.

In the embodiment depicted in FIG. 4, input/output interface 62 receives signals from aircraft avionics 90, camera 12, and fiducial detection system 94. In some embodiments, input/output interface 62 and/or fiducial detection system 94 can receive signals from other systems. For example, in some embodiments signals can be received from other active aircraft. Such other aircraft can send signals that have been generated by navigation aid systems associated with such other active aircraft. In other embodiments, image enhancement system can receive signals that are generated and sent from fiducial detection systems associated with other ground-based systems.

Input/output interface 62, in one example, utilizes the communications module to communicate with external devices via one or more networks, such as one or more wireless or wired networks, or both. The communications module can be a network interface card, such as an Ethernet card, an optical transceiver, a radio frequency transceiver, or any other type of device that can send and receive information. The communications module can be a network interface card, such as an Ethernet card, an optical transceiver, a radio frequency transceiver, or any other type of device that can send and receive information. Other examples of such network interfaces can include Bluetooth, 3G, 4G, 5G, and Wi-Fi radio computing devices as well as Universal Serial Bus (USB). In some embodiments, communication with image enhancement system 60 can be performed via a communications bus, such as, for example, an Aeronautical Radio, Incorporated (ARINC) standard communications protocol either directly to input/output interface 62 or via aircraft avionics 90. In an exemplary embodiment, aircraft communication with image enhancement system 60 can be performed via a communications bus, such as, for example, a Controller Area Network (CAN) bus. In some embodiments, image enhancement system 60 can provide data to other systems via aircraft avionics 90. In an exemplary embodiment, data from image enhancement system 60 can be transferred via aircraft avionics 90 to a flight data recording device.

Video display 70 can be used to communicate information between image enhancement system 60 and the flight crew of taxiing aircraft 10. In some embodiments, video display 70 can include additional information for the flight crew. The visual display can use any of CRT, LCD, Plasma, and/or OLED technologies, for example, including an Electronic Flight Bag (EFB) or Primary Flight Display (PFD).

Aural alerting device 72 also can be used to communicate information between image enhancement system 60 and the flight crew of taxiing aircraft 10. In some embodiments, aural alerting device 72 can be a speaker, a bell, a horn, a siren, or some other audio transducer. Various other types of audible systems can be used, such as computer generated speech, and so on.

In the illustrated embodiment, video display 70 and/or aural alerting device 72 can provide indications to the flight crew of taxiing aircraft 10 when various fiducials are detected and/or are lost from detection, when aircraft 10 is aligned with various fiducials, when aircraft 10 deviates from alignment with various fiducials, and when aircraft 10 crosses various fiducials. For example, in response to aircraft 10 aligning with enhanced center line 50, a pleasant signal can be provided to the flight crew. When aircraft 10 deviates from enhanced center line 50 by an established distance, or when aircraft 10 approaches within an enhanced distance of edge line 54, a warning indication can be provided to the flight crew.

In the illustrated embodiment, video display 70 and/or aural alerting device 72 can provide indications to the flight crew of impending changes to the planned path of taxiing aircraft 10. For example, video display 70 and/or aural alerting device 72 can provide a signal alerting the flight crew to prepare to turn aircraft 10 in a certain direction along the intended ground path.

Referring back to FIG. 2C, image enhancement system 60 generates and displays an image representing the perspective view of the taxiing environment of aircraft 10. The displayed image can include the visual image that is provided from camera 12. The visual image can be enhanced to improve visual contrast in low-light conditions. The displayed image can also include enhanced centerline 50, enhanced center lights 52, enhanced edge lines 54, and enhanced edge lights 56 superimposed on the image shown on video display 70. In the illustrated embodiment, enhanced center lights 52 and enhanced edge lights 56 are different colors. For example, enhanced center lights can be green in color, and enhanced edge lights can be blue in color.

In some embodiments, image enhancement system 60 can be programmed with the intended ground path of aircraft 10. The data representing the intended ground path of aircraft 10 can be provided via input/output interface 62 or at user input device 66. In these embodiments, image enhancement system 60 can indicate the intended path of aircraft 10 on video display 70 for the flight crew. For example, enhanced center line 50 and/or enhanced center lights 52 can be represented larger and/or brighter than center lines 26. In some embodiments, enhanced center line 50 and/or enhanced center lights 52 can be represented in a different color, or by flashing, or both. In other embodiments, image enhancement system 60 can be input to a moving maps system to assist the flight crew in providing ground navigation of aircraft 10. Accordingly, navigation aid system 58 can help enhance the situational awareness of the flight crew.

Referring again to FIG. 4, storage device(s) 74 can be configured to store information within image enhancement system 60 during operation. Storage device(s) 74, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 74 is a temporary memory, meaning that a primary purpose of storage device(s) 74 is not long-term storage. Storage device(s) 74, in some examples, is described as volatile memory, meaning that storage device(s) 74 do not maintain stored contents when power to image enhancement system 60 is turned off. Examples of volatile memories can include random access memories (RAM), dynamic random access memories (DRAM), static random access memories (SRAM), and other forms of volatile memories. In some examples, storage device(s) 74 are used to store program instructions for execution by processor(s) 64. Storage device(s) 74, in one example, is used by software or applications running on image enhancement system 60 (e.g., a software program implementing long-range cloud conditions detection) to temporarily store information during program execution.

In some embodiments, image enhancement system 60 can evaluate multiple fiducial markings being received by camera 12 to evaluate where aircraft 10 is located at airport 20. In these embodiments, navigation aid system 58 can be used to obtain a navigational position fix on a moving maps system. In other embodiments, image enhancement system 60 can read signs, letters, numbers, words, or other markings for use in airport ground navigation. For example, in some embodiments, navigation aid system 58 can read runway number 36 as aircraft 10 approaches assigned runway 22 for take-off and provide an indication of the value of runway number to the flight crew. In some embodiments, the various signs, letters, numbers, words, and other markings can be transmitted to aircraft avionics system 90 via I/O interface 62. In these embodiments, these transmitted data can be used to verify with ground control personnel the correctness of the intended location of aircraft 10. Further, by the compilation of fiducial assessments at a given instance, processor(s) 64 can evaluate the identified location of aircraft 10 on a given airport as retrieved from an airport database for airport 20 that is stored in object database 80. Accordingly, navigation aid system 58 can evaluate the location of aircraft 10 against the airport database for airport 20 and determine whether aircraft 10 is in a forbidden location at airport 20. In some embodiments, navigation aid system 58 can evaluate whether aircraft 10 is on a trajectory that could result in aircraft 10 entering a forbidden location at airport 20 and issue a warning to the flight crew so that appropriate action can be taken to prevent this situation from occurring.

Storage device(s) 74, in some examples, also include one or more computer-readable storage media. Storage device(s) 74 can be configured to store larger amounts of information than volatile memory. Storage device(s) 74 can further be configured for long-term storage of information. In some examples, storage device(s) 74 include non-volatile storage elements. Non-limiting examples of such non-volatile storage elements can include magnetic hard discs, optical discs, flash memories, or forms of electrically programmable memories (EPROM) or electrically erasable and programmable (EEPROM) memories.

User input devices 66, in some examples, are configured to receive input from a user. Non-limiting examples of user input devices 66 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus. User output devices 68 can be configured to provide output to a user. Non-limiting examples of user output devices 68 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Discussion of Possible Embodiments

The following are non-exclusive descriptions of possible embodiments of the present invention.

A system for determining a location of an aircraft relative to fiducial markings of airport byways, the system comprising: a camera configured to be mounted to the aircraft and further configured to capture a time-sequence of images of a scene external to the aircraft, the scene including the airport byways and the fiducial markings; and image processing circuitry configured to identify pixel coordinates within each of the time-sequence of captured images corresponding to the fiducial markings, and further configured to determine the location of the aircraft relative to the fiducial markings based on the identified pixel coordinates.

The system of the preceding paragraph can optionally include, additionally and/or alternatively, any one or more of the following features, configurations and/or additional components:

A further embodiment of the foregoing system, further comprising a video display configured to display the time-sequence of images of the scene external to the aircraft.

A further embodiment of the foregoing system, wherein the image processing circuitry is further configured to generate enhanced images having symbols corresponding to the fiducial markings, wherein the symbols are positioned at the locations corresponding to the identified pixel coordinates of the fiducial markings.

A further embodiment of the foregoing system, wherein the enhanced images are displayed on the video display comprising one or more colors.

A further embodiment of the foregoing system, wherein a lateral deviation signal is calculated, the lateral deviation signal representing the lateral distance between the location of the aircraft and a lateral intended location of the aircraft.

A further embodiment of the foregoing system, wherein the fiducial markings are selected from the group consisting of: center line, edge line, shoulder, turn arc, stop line, runway numbers, center lights, and edge lights.

A further embodiment of the foregoing system, wherein the image processor is further configured to display on the video display a path representing a desired byway path for the aircraft to follow.

A further embodiment of the foregoing system, further comprising an input/output interface configured to exchange data with an aircraft avionics system.

A further embodiment of the foregoing system, further comprising a user input device configured to receive data from a user.

A method for determining a location of an aircraft relative to fiducial markings of airport byways, the method comprising the steps of: capturing, by a camera disposed on the aircraft, a time-sequence of images of a scene external to the aircraft, wherein the scene includes the byways and the fiducial markings; identifying, by image processing circuitry, pixel coordinates within each of the time sequence of captured images corresponding to the fiducial markings; and determining, by the image processing circuitry, the location of the aircraft relative to the fiducial markings based on the identified pixel coordinates.

The method of the preceding paragraph can optionally include, additionally and/or alternatively, any one or more of the following features, configurations and/or additional components:

A further embodiment of the foregoing method, further comprising the steps of: generating, by the image processor, enhanced images having symbols corresponding to the fiducial markings; and displaying, on a video display, the time-sequence of images of the scene external to the aircraft and the enhanced images having the symbols corresponding to the fiducial markings.

A further embodiment of the foregoing method, wherein the location of the aircraft relative to fiducial markings is displayed on the video display.

A further embodiment of the foregoing method, wherein the location of the aircraft relative to fiducial markings is produced by an aural alert device.

A further embodiment of the foregoing method, wherein the fiducial markings are selected from the group consisting of: center line, edge line, shoulder, turn arc, stop line, runway numbers, center lights, and edge lights.

A system comprising: a camera disposed on an aircraft; one or more processors; and computer-readable memory encoded with instructions that, when executed by the one or more processors, cause the system to: capture, by the camera, a time-sequence of images of a scene external to the aircraft, the scene including byways and indicia of the byway boundaries; identify, by image processing circuitry, pixel coordinates within each of the time-sequence of captured images corresponding to the indicia of the byway boundaries; and determine, by the image processing circuitry, a location of the aircraft relative to the byway boundaries based on the identified pixel coordinates.

The system of the preceding paragraph can optionally include, additionally and/or alternatively, any one or more of the following features, configurations and/or additional components:

A further embodiment of the foregoing system, wherein the computer-readable memory is further encoded with instructions that, when executed by the one or more processors, cause the system to: display, on a video display, the time-sequence of images of the scene external to the aircraft; generate enhanced images corresponding to the indicia of the byway boundaries, wherein the enhanced images include symbols corresponding to calculated pixel coordinates of the byway boundaries; and display, on the video display, the enhanced images.

A further embodiment of the foregoing system, wherein the computer-readable memory is further encoded with instructions that, when executed by the one or more processors, cause the system to: determine the location of the aircraft relative to the byway boundaries based on the identified pixel coordinates; calculate a control band relative to the byway boundaries; and determine the location of the aircraft relative to the control band.

A further embodiment of the foregoing system, wherein the computer-readable memory encoded with instructions that, when executed by the one or more processors, cause the system to generate a lateral deviation signal representing a lateral distance between the location of the aircraft and an intended location of the aircraft.

A further embodiment of the foregoing system, wherein the computer-readable memory is further encoded with instructions that, when executed by the one or more processors, cause the system to communicate by an aural alert device a signal representative of the location of the aircraft relative to the byway boundaries.

A further embodiment of the foregoing system, wherein the computer-readable memory is further encoded with instructions that, when executed by the one or more processors, cause the system to exchange data with an aircraft avionics system representing the location of the aircraft relative to the byway boundaries.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for determining a location of an aircraft relative to fiducial markings of airport byways, the system comprising:
    a camera configured to be mounted to the aircraft and further configured to capture a time-sequence of images of a scene external to the aircraft, the scene including the airport byways and the fiducial markings;
    image processing circuitry configured to identify pixel coordinates within each of the time-sequence of captured images corresponding to the fiducial markings, and further configured to determine the location of the aircraft relative to the fiducial markings based on the identified pixel coordinates,
    wherein the image processing circuitry is further configured to generate enhanced images of each of the time sequence of images of the scene external to the aircraft, the enhanced images having symbols corresponding to the fiducial markings superimposed, upon the time sequence of images of the scene external to the aircraft, at the locations corresponding to the identified pixel coordinates of the fiducial markings.

2. The system of claim 1, further comprising a video display configured to display the enhanced images of the time-sequence of images of the scene external to the aircraft.

3. The system of claim 1, wherein the enhanced images are displayed on the video display comprising one or more colors.

4. The system of claim 1, wherein a lateral deviation signal is calculated, the lateral deviation signal representing the lateral distance between the location of the aircraft and a lateral intended location of the aircraft.

5. The system of claim 1, wherein the fiducial markings are selected from the group consisting of: center line, edge line, shoulder, turn arc, stop line, runway numbers, center lights, and edge lights.

6. The system of claim 2, wherein the image processor is further configured to display on the video display a path representing a desired byway path for the aircraft to follow.

7. The system of claim 1, further comprising an input/output interface configured to exchange data with an aircraft avionics system.

8. The system of claim 1, further comprising a user input device configured to receive data from a user.

9. A method for determining a location of an aircraft relative to fiducial markings of airport byways, the method comprising the steps of:
    capturing, by a camera disposed on the aircraft, a time-sequence of images of a scene external to the aircraft, wherein the scene includes the byways and the fiducial markings;
    identifying, by image processing circuitry, pixel coordinates within each of the time sequence of captured images corresponding to the fiducial markings;
    determining, by the image processing circuitry, the location of the aircraft relative to the fiducial markings based on the identified pixel coordinates; and
    generating, via the image processing circuitry, enhanced images of each of the time sequence of images of the scene external to the aircraft, the enhanced images having symbols corresponding to the fiducial markings superimposed, upon the time sequence of images of the scene external to the aircraft, at the locations corresponding to the identified pixel coordinates of the fiducial markings.

10. The method of claim 9, further comprising the step of:
    displaying, on a video display, the enhanced images of the time-sequence of images of the scene external to the aircraft.

11. The method of claim 10, wherein the location of the aircraft relative to fiducial markings is displayed on the video display.

12. The method of claim 9, wherein the location of the aircraft relative to fiducial markings is produced by an aural alert device.

13. The method of claim 10, wherein the fiducial markings are selected from the group consisting of: center line, edge line, shoulder, turn arc, stop line, runway numbers, center lights, and edge lights.

14. A system comprising:
    a camera disposed on an aircraft;
    one or more processors; and
    computer-readable memory encoded with instructions that, when executed by the one or more processors, cause the system to:
        capture, by the camera, a time-sequence of images of a scene external to the aircraft, the scene including airport byways and fiducial markings of airport byways;
        identify, by image processing circuitry, pixel coordinates within each of the time-sequence of captured images corresponding to the fiducial markings;

determine, by the image processing circuitry, a location of the aircraft relative to the fiducial markings based on the identified pixel coordinates; and generate, via the image processing circuitry, enhanced images of each of the time sequence of images of the scene external to the aircraft, the enhanced images having symbols corresponding to the fiducial markings superimposed, upon the time sequence of images of the scene external to the aircraft, at the locations corresponding to the identified pixel coordinates of the fiducial markings.

15. The system of claim 14, wherein the computer-readable memory is further encoded with instructions that, when executed by the one or more processors, cause the system to:

display, on a video display, the enhanced images of the time-sequence of images of the scene external to the aircraft.

16. The system of claim 14, wherein the computer-readable memory is further encoded with instructions that, when executed by the one or more processors, cause the system to:

determine the location of the aircraft relative to the byway boundaries based on the identified pixel coordinates;

calculate a control band relative to the byway boundaries; and determine the location of the aircraft relative to the control band.

17. The system of claim 16, wherein the computer-readable memory encoded with instructions that, when executed by the one or more processors, cause the system to generate a lateral deviation signal representing a lateral distance between the location of the aircraft and an intended location of the aircraft.

18. The system of claim 17, wherein the computer-readable memory is further encoded with instructions that, when executed by the one or more processors, cause the system to communicate by an aural alert device a signal representative of the location of the aircraft relative to the byway boundaries.

19. The system of claim 14, wherein the computer-readable memory is further encoded with instructions that, when executed by the one or more processors, cause the system to exchange data with an aircraft avionics system representing the location of the aircraft relative to the byway boundaries.

* * * * *